(12) United States Patent
Sydlowski

(10) Patent No.: US 8,166,704 B1
(45) Date of Patent: May 1, 2012

(54) PLANT WATERING DEVICE

(76) Inventor: Russell L. Sydlowski, Union, OH (US)

( * ) Notice: Subject to any disclaimer, the term of this patent is extended or adjusted under 35 U.S.C. 154(b) by 315 days.

(21) Appl. No.: 12/433,350

(22) Filed: Apr. 30, 2009

(51) Int. Cl.
*A01G 25/02* (2006.01)

(52) U.S. Cl. ............................................. 47/48.5; 47/79

(58) Field of Classification Search .................. 47/48.5, 47/79; A01G 29/00, 25/06, 25/02, 25/00
See application file for complete search history.

(56) References Cited

U.S. PATENT DOCUMENTS

| | | | |
|---|---|---|---|
| 3,085,364 A | 4/1963 | Chapin | |
| 3,357,129 A * | 12/1967 | Torrence | 47/79 |
| 3,749,319 A | 7/1973 | Fischer | 239/318 |
| 4,183,176 A | 1/1980 | Barfield | |
| 5,220,745 A * | 6/1993 | Elliott et al. | 47/79 |
| 5,415,347 A | 5/1995 | Negroni | |
| 5,473,838 A * | 12/1995 | Denbigh | 47/40.5 |
| 5,511,341 A * | 4/1996 | Payne | 47/79 |
| 5,836,106 A * | 11/1998 | Alex | 47/48.5 |
| 5,881,495 A * | 3/1999 | Clark | 47/48.5 |
| 6,076,300 A * | 6/2000 | Cronin | 47/48.5 |
| 6,220,293 B1 | 4/2001 | Rashidi | |
| 6,340,034 B1 | 1/2002 | Arnott et al. | |
| 6,397,888 B1 | 6/2002 | Wang | |
| D486,884 S | 2/2004 | Gregory et al. | |
| 7,121,477 B1 | 10/2006 | Noelke | |
| 2003/0005602 A1 | 1/2003 | Morse | |
| 2003/0102039 A1 | 6/2003 | Marzorati | |
| 2003/0154652 A1* | 8/2003 | Dramm et al. | 47/48.5 |
| 2003/0177695 A1* | 9/2003 | Manning | 47/48.5 |
| 2006/0064929 A1* | 3/2006 | Allen | 47/48.5 |
| 2008/0155892 A1* | 7/2008 | Katzir-Shimoni et al. | 47/39 |
| 2009/0151798 A1* | 6/2009 | Harned | 137/513.3 |
| 2009/0249689 A1* | 10/2009 | Tran | 47/66.6 |

* cited by examiner

*Primary Examiner* — Son T Nguyen
*Assistant Examiner* — Kathleen Iwasaki

(57) ABSTRACT

A plant watering device that includes a central reservoir and a number of valve-controlled outlet lines that allow an individual to individually control the outflow of water into one or more outlet lines.

2 Claims, 5 Drawing Sheets

PLANT WATERING DEVICE

BACKGROUND OF THE INVENTION

The present invention concerns that of a new and improved plant watering device that includes a central reservoir and a number of valve-controlled outlet lines that allow an individual to individually control the outflow of water into one or more outlet lines.

SUMMARY OF THE INVENTION

The present invention concerns that of a new and improved plant watering device that includes a central reservoir and a number of valve-controlled outlet lines that allow an individual to individually control the outflow of water into one or more outlet lines.

There has thus been outlined, rather broadly, the more important features of a plant watering device that the detailed description thereof that follows may be better understood and in order that the present contribution to the art may be better appreciated. There are, of course, additional features of the plant watering device that will be described hereinafter and which will form the subject matter of the claims appended hereto.

In this respect, before explaining at least one embodiment of the plant watering device in detail, it is to be understood that the plant watering device is not limited in its application to the details of construction and to the arrangements of the components set forth in the following description or illustrated in the drawings. The plant watering device is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present plant watering device. It is important, therefore, that the claims be regarded as including such equivalent constructions insofar as they do not depart from the spirit and scope of the present invention.

It is therefore an object of the present invention to provide a plant watering device which has all of the advantages of the prior art and none of the disadvantages.

It is another object of the present invention to provide a plant watering device which may be easily and efficiently manufactured and marketed.

It is another object of the present invention to provide a plant watering device which is of durable and reliable construction.

It is yet another object of the present invention to provide a plant watering device which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
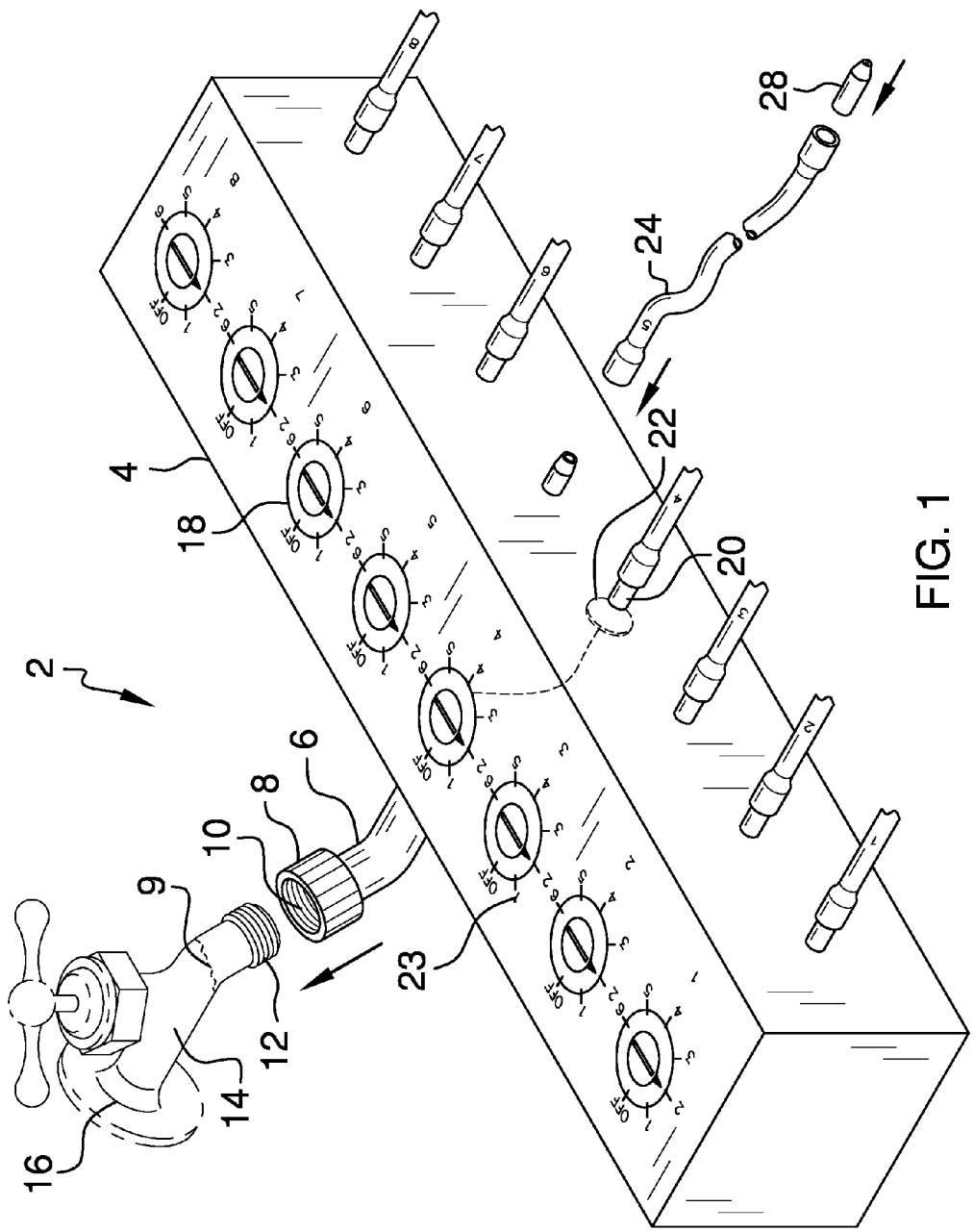
FIG. 1 shows an upper perspective view of the plant watering device.
Figure 2:
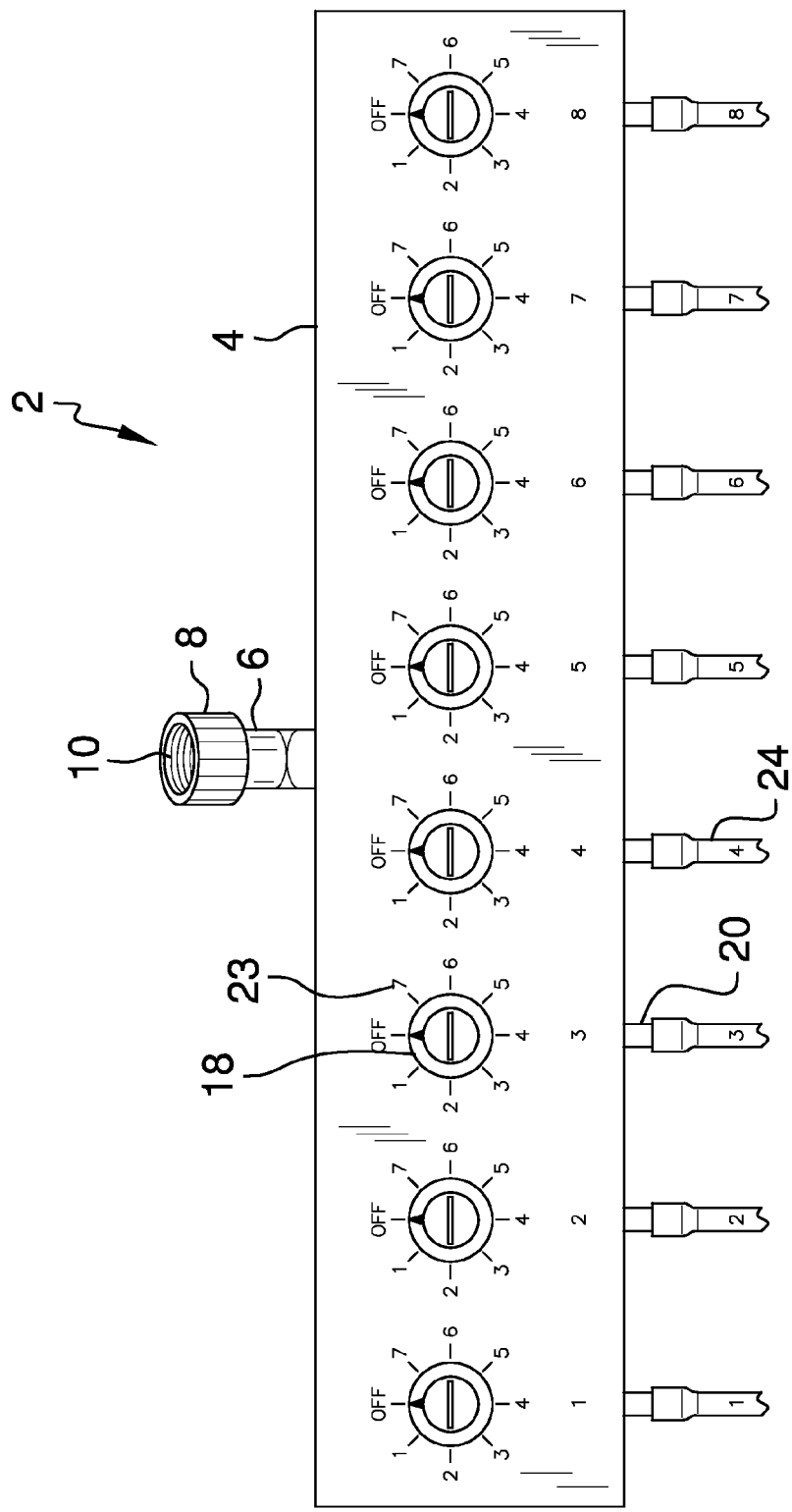
FIG. 2 shows a top view of the plant watering device.
Figure 3:
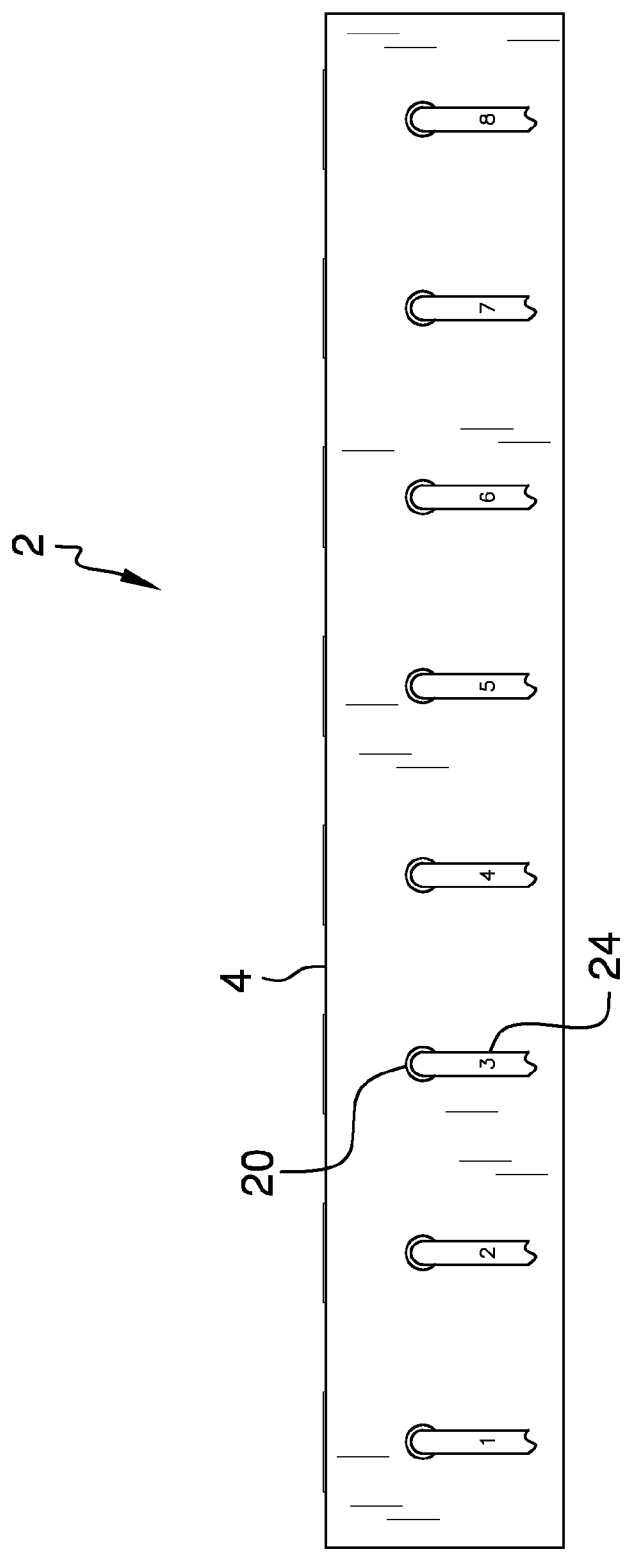
FIG. 3 shows a front view of the plant watering device.
Figure 4:
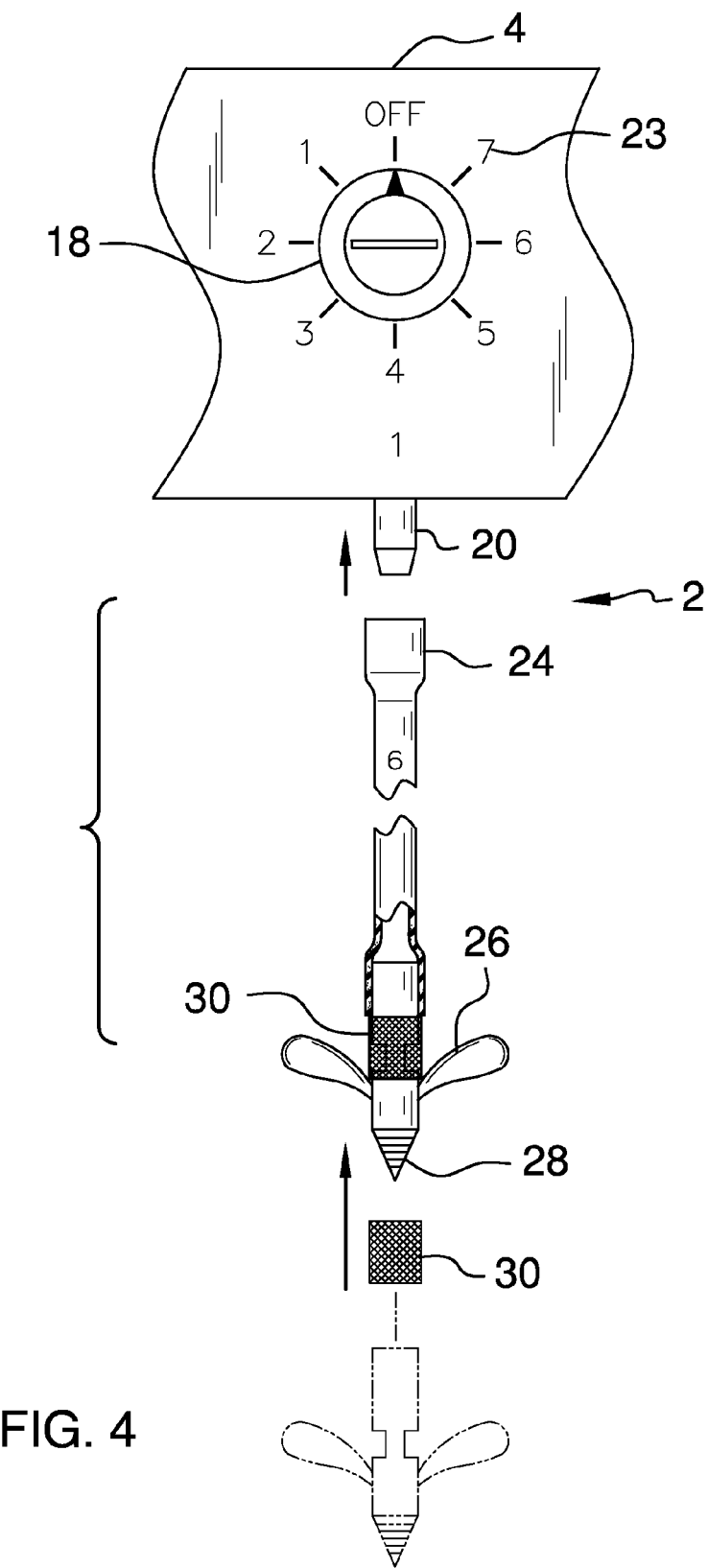
FIG. 4 shows a top view of a single valve attached to the plant watering device and the particular components attached to the outflow valve associated with the valve.
Figure 5:
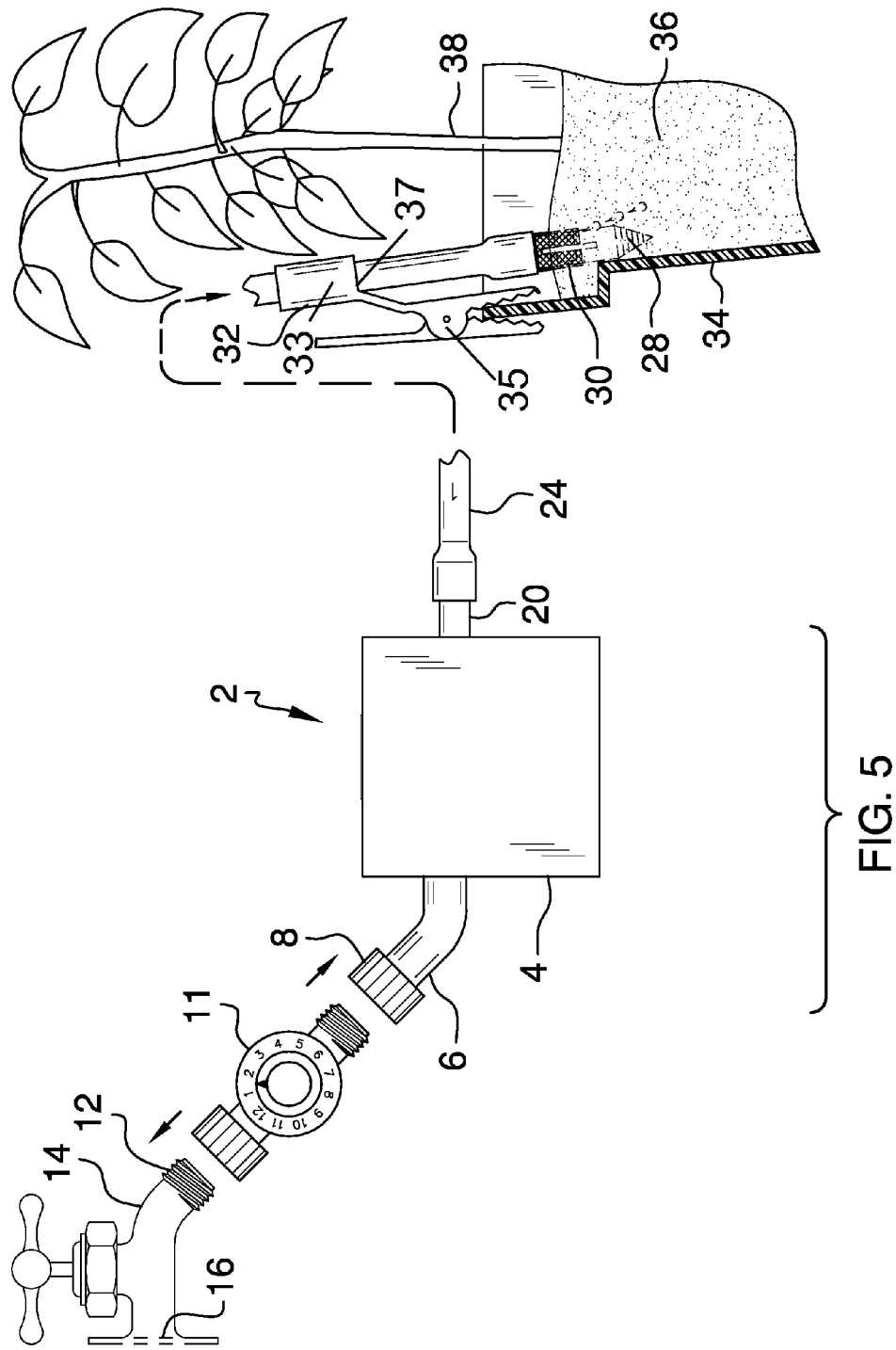
FIG. 5 shows a side view of a single valve attached to the plant watering device and the particular components attached to the outflow valve associated with the valve, and furthermore, including various optional components that could be used with the plant watering device.

With reference now to the drawings, and in particular to FIGS. 1 through 5 thereof, a plant watering device embodying the principles and concepts of the present invention and generally designated by the reference numeral 2 will be described.

As best illustrated in FIGS. 1 through 5, the plant watering device 2 comprises a central reservoir 4, with the central reservoir 4 preferably being box-shaped. The central reservoir 4 has an input coupling 6 that has an attached spigot connection 8. Internal threads 10 located within the spigot connection 8 are capable of being connected to external threads 12 that are attached to a hose spigot 14 which is connected to a water source 16 that contains a volume of water 9. A timer 11 is disposed between the spigot 14 and the input coupling 6.

The plant watering device 2 also includes a plurality of flow control dials 18 and a plurality of outlet couplings 20. Each flow control dial 18 is attached to the reservoir 4 and is associated with a particular outlet coupling 20, which is a small tube-shaped attached coupled with the central reservoir 4. Each flow control dial 18 is connected to a restrictor plate 22 located within the central reservoir 4, with each flow control dial 18 capable of altering the amount of water that exits the central reservoir 4 through the outlet coupling 20 associated with the flow control dial 18. Each flow control dial 18 has a plurality of settings 23 which range from "no flow" to a maximum, pre-set value, with each variable setting on the flow control dial 18 placing the restrictor plate 22 in the path of the water 9 entering the associated outlet coupling 20 in a slightly different position, thereby allowing each setting to essentially provide for differing amounts of water 9 that exit the respective outlet coupling 20.

Each flow control dial 18 has a plurality of settings 23 which range from "no flow" to a maximum, pre-set value.

The number of flow control slots 18 and outlet couplings 20 can vary widely, but preferably, each of these two components of the plant watering device 2 numbers a total of eight items each.

A hose 24 is attached to each outlet coupling 20, with each hose 24 having a drip nozzle 28 attached to it. To allow the drip nozzle 28 to be easily inserted into an amount of dirt 36, a push handle 26 is also associated with each hose 24 and drip nozzle 28. Furthermore, a mesh cover 30 is also associated with each push handle and ultimately rests immediately above the surface of the dirt 36 after the drip nozzle 28 has been inserted into the dirt 36.

In use, the drip nozzle 28 would be inserted into an amount of dirt 36, preferably within a container 34. The container 34 would include at least one plant 38 that would be growing out of the dirt 36. Preferably, at least one attachment clip 32 would be associated with each hose 24, allowing the hose 24 and associated drip nozzle 28 to be "locked in" to a particular place once the drip nozzle 28 is placed strategically close to the plant 38 located within the dirt 36 in the container 34. The attachment clip 32 includes a sleeve 33 and a spring clip 35. The spring clip 35 is disposed on an end 37 of the sleeve 33. The attachment clip 32 sleeve 33 is attached to the hose 24, further wherein the spring clip 35 is removably attached to the container 34.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A plant watering device comprising:
a central reservoir;
means for inserting a volume of water into the central reservoir;
means for expelling some of the volume of water from the central reservoir;
means for placing water on a plant;
wherein the central reservoir is box-shaped;
wherein the means for inserting a volume of water into the central reservoir further comprises;
an input coupling attached to the reservoir;
a water source under pressure;
a hose spigot connected to the water source;
means for connecting the input coupling to the hose spigot;
wherein the means for connecting the input coupling to the hose spigot further comprises:
a spigot connection attached to the input coupling;
a plurality of internal threads located within the spigot connection;
a plurality of external threads located on the hose spigot;
wherein the spigot connection is threadably attached to the hose spigot,
a timer disposed between the spigot and the input coupling;
wherein the means for expelling some of the volume of water from the central reservoir further comprises:
a plurality of outlet couplings attached to the central reservoir;
a plurality of flow control slots attached to the central reservoir, wherein each flow control slot is associated with one particular outlet coupling;
means for controlling the amount of water that exits each outlet coupling;
wherein the means for controlling the amount of water that exits each outlet coupling further comprises;
a plurality of restrictor plates, wherein each restrictor plate is associated with one outlet coupling of the plurality of outlet couplings, further wherein each restrictor plate is associated with one flow control slot;
wherein each flow control slot has a plurality of settings;
further wherein each setting allows water within the central reservoir to exit the respective outlet coupling at a different rate;
wherein the means for placing water on a plant further comprises;
a plurality of hoses, wherein each hose is connected to a respective one of the outlet couplings;
a plurality of drip nozzles, wherein each drip nozzle is attached to one of the hoses attached to a respective one of the outlet couplings;
an amount of dirt, wherein the plant is placed within the dirt;
an object to contain the dirt;
means for assisting an individual to insert the drip nozzle into the dirt;
wherein water will pass from the central reservoir, through the outlet coupling and the hose, and exit the drip nozzle;
wherein the object to contain the dirt preferably comprises a container;
wherein the means for assisting an individual to insert the drip nozzle into the dirt further comprises;
a plurality of push handles;
wherein each push handle is attached to one of the hoses attached to a respective one of the outlet couplings;
a mesh cover;
wherein the device further comprises means for removably attaching the hose to the container, said means further comprising:
an attachment clip comprising a sleeve and a spring clip, the spring clip disposed on an end of the sleeve,
wherein the attachment clip sleeve is attached to the hose,
further wherein the spring clip is removably attached to the container.

2. A plant watering device comprising:
(a) a central reservoir, wherein the central reservoir is box-shaped,
(b) means for inserting a volume of water into the central reservoir, said means further comprising (1) an input coupling attached to the reservoir, (2) a water source, (3) a hose spigot connected to the water source, and (4) means for connecting the input coupling to the hose spigot, said means further comprising (i) a spigot connection attached to the input coupling, (ii) a plurality of internal threads located within the spigot connection, (iii) a plurality of external threads located on the hose spigot, (iv) wherein the spigot connection is threadably attached to the hose spigot, (v) a timer disposed between the spigot and the input coupling,
(c) means for expelling some of the volume of water from the central reservoir, said means further comprising (1) a plurality of outlet couplings attached to the central reservoir, (2) a plurality of flow control slots attached to the central reservoir, wherein each flow control slot is associated with one particular outlet coupling, (3) means for controlling the amount of water that exits each outlet coupling, said means further comprising (i) a plurality of restrictor plates, wherein each restrictor plate is associated with one outlet coupling of the plurality of outlet couplings, further wherein each restrictor plate is associated with one flow control slot, (ii) wherein each flow control slot has a plurality of settings, (iii) further wherein each setting allows water within the central reservoir to exit the respective outlet coupling at a different rate,
(d) means for placing water on a plant, said means further comprising (1) a plurality of hoses, wherein each hose is connected to an outlet coupling, (2) a plurality of drip nozzles, wherein each drip nozzle is attached to one of the hoses attached to a respective one of the outlet couplings, (3) an amount of dirt, wherein the plant is placed within the dirt, (4) an object to contain the dirt, wherein said object preferably comprises a container, (5) means for assisting an individual to insert the drip nozzle into the dirt, said means further comprising (i) a plurality of push handles, (ii) wherein each push handle is attached one of the hoses attached to a respective one of the outlet couplings, (6) wherein water will pass from the central reservoir, through the outlet coupling and the hose, and exit the drip nozzle, (e) a mesh cover, (f) means for removably attaching the hose to the container, said means further comprising (1) an attachment clip comprising a sleeve and a spring clip, the spring clip disposed on an end of the sleeve, (2) wherein the attachment clip sleeve is attached to the hose, (3) further wherein the spring clip is removably attached to the container.

* * * * *